Nov. 9, 1965    D. L. McKAY ETAL    3,216,833
CONCENTRATION OF AQUEOUS SOLUTIONS BY CRYSTALLIZATION
Filed March 16, 1962
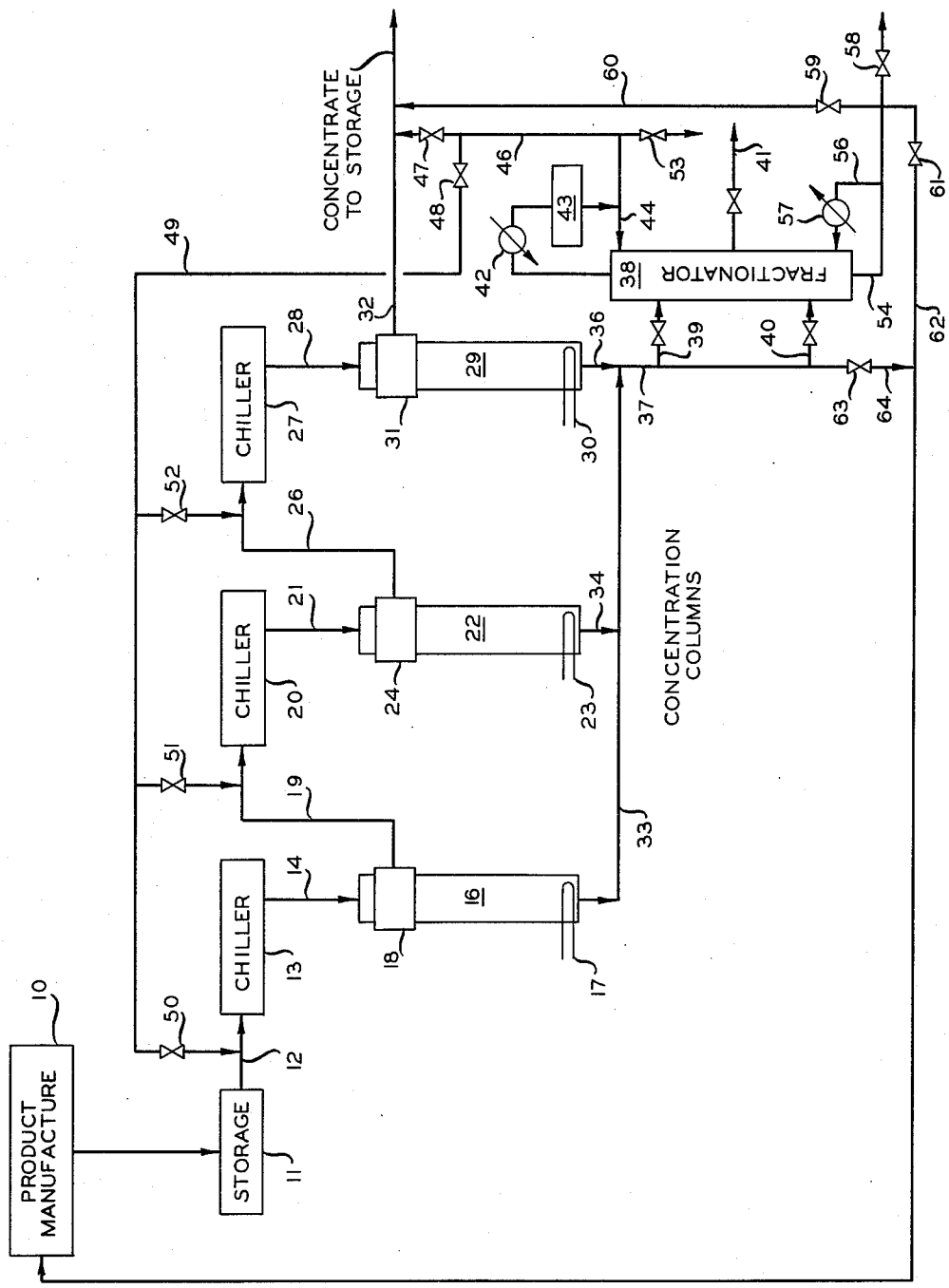
INVENTORS
D. L. McKAY
E. W. MELLOW
BY
Young & Quigg
ATTORNEYS

United States Patent Office 3,216,833
Patented Nov. 9, 1965

3,216,833
CONCENTRATION OF AQUEOUS SOLUTIONS BY CRYSTALLIZATION
Dwight L. McKay and Ernest W. Mellow, Bartlesville, Okla., assignors to Phillips Petroleum Company, a corporation of Delaware
Filed Mar. 16, 1962, Ser. No. 180,099
8 Claims. (Cl. 99—199)

This invention relates to a method of concentrating aqueous solutions by crystallization. In another aspect it relates to a method of increasing the capacity of a crystal purification system used in the concentration of aqueous solutions.

It is known that aqueous solutions can be concentrated in processes involving freezing to form ice crystals with subsequent separation of the ice crystals from the mother liquor. This method of concentrating food products is becoming more and more popular because it can be carried out without damaging the taste of the product. In this respect, concentration by crystallization represents a considerable improvement over evaporative processes which rely upon heat or extremely low pressures. In either event, the removal of water by evaporation also results in the removal of essential oils and esters, many of which cannot be recovered, so that the concentrated product can never be restored to its original freshness and flavor. Concentration by crystallization can be used to advantage in the processing of such food products and beverages as milk, fruit juices, vegetable juices, vinegar, beer, wine, liquors and the like. As applied to beer the process has the additional advantage of serving as an accelerated lagering process thereby reducing the requirement for large inventories and refrigerated storage tanks in breweries.

In the patent to Schmidt Re. 23,810 there is disclosed a process and apparatus for purifying crystals which involves moving a mixture of crysals and mother liquor through a purification column in which the crystals are passed in a compact mass toward a body of crystal melt which is displaced back into the crystal mass. The purification column includes an upstream liquid removal zone, a middle reflux zone and a downstream melting zone. Mother liquor is removed from the crystals in the liquid removal zone and the crystals are melted in the melting zone. A portion of the crystal melt is withdrawn from the melting zone and the remainder is forced back into the crystal mass in the reflux zone. This apparatus, which will be referred to hereinafter as a crystal purification column, can be used to concentrate fruit juices, vegetable juices, wine, beer, milk, and the like and is capable of separating substantially pure water from the concentrated beverage. We have now discovered a method of increasing the capacity of a system employing these crystal purification columns without loss of essential components or sacrifice in the flavor or quality of the finished product.

According to our invention, a process is provided for concentrating an aqueous solution such as a beverage or food product as named above, which comprises cooling the aqueous solution to form a slurry of ice crystals in a mother liquor and passing said slurry into a crystal purification column. The crystals in the mother liquor are introduced to a confined zone wherein the ice crystals are passed in a compact mass into a body of crystal melt and the ice crystals are heated to form said melt in the downstream portion of the confined zone. The process further comprises withdrawing the mother liquor as a concentrated aqueous solution from an upstream portion of the confined zone and withdrawing melt containing water and nonaqueous components of the mother liquor from the downstream portion of the zone. Thereafter, the withdrawn crystal melt containing mother liquor components is distilled to effect a separation between said components and the water, and the recovered components are then recombined with the mother liquor in the process. These recovered components can be recombined with the mother liquor by returning them to the cooling step in which the ice crystals are formed in the mother liquor, or the recovered components can be added directly to the concentrated solution removed as a product from the purification column. The essential advantages of the concentration by crystallization are realized in our process since a very small fraction of the overall recovered product is subjected to heat in the distillation step. By relying upon distillation for recovery of the final fractions of product, however, the crystal purification columns can be operated at substantially greater throughputs. That is to say, by operating the crystal purification columns at lower efficiencies so that a small portion of the mother liquor components are passed out of the column with the crystal melt, the overall capacity of the operation can be greatly increased and the mother liquor components can be recovered from the crystal melt by distillation without seriously detracting from the quality of the final product.

In another aspect of our invention as applied to the concentration of beer, crystal purification columns are operated as described above after forming a crystal slurry of the beer as it comes from the fermentation stage of the brewing process so as to form water streams from the crystal melt of the purification columns containing about 97 to 99 weight percent water. At least a portion of these water streams obtained from one or more crystal purification units is returned to the brewing process and can be used as makeup water, for example in the mashing or sparging steps, so that there is no loss of alcohol or sugars which are present in these water streams.

It is the object of our invention to provide an improved method of concentrating aqueous solutions by crystallization. Another object of our invention is to increase the capacity of a crystal purification system which is used in the concentration of aqueous solutions. Still another object of our invention is to provide a process for concentrating aqueous solutions combining the methods of concentration by crystallization and distillation. Still another object is to provide a method for concentrating beer using crystal purification columns in such a manner that substantially greater capacity of the operation is obtained. Other objects, advantages and features of our invention will be apparent to those skilled in the art from the following discussion and drawing which is a schematic flow diagram illustrating our invention.

While our invention can be applied advantageously to the concentration of any aqueous solution, it is of particular value in the concentration of beverages or food products where preservation of flavor is important. In the case of many fruit juices currently marketed, concentration of the product enables preservation thereof in the frozen form. The concentration also greatly reduces packaging, transportation and storage expenses and in all cases, the products can be readily reconstituted prior to use simply by adding water to replace that which was removed in the concentration process.

A typical process is illustrated by the flow diagram of the drawing. The manufacture of the product is indicated at 10. For example, in the manufacture of fruit or vegtable juices this operation would include pressing and filtration as normally required. In the manufacture of beer this would include mashing, sparging, brewing and fermentation. In the manufacture of vinegar, such steps as alcohol fermentation, acetic fermentation, aging, filtration and clarification would normally be included. Whatever the product being treated, it would normally be fully prepared prior to concentration. In the case of beer, however, the concentration process can be combined with filtration to replace lagering. Also, final carbonation would be postponed until after reconstitution and it may be desirable to remove at least a portion of the carbon dioxide which is present in the beer as it comes from the fermentation process. In the manufacture of citrus juices, pulp should be removed by filtration prior to concentration in the crystal purification columns and if these pulps are desired in the final product they can be added to the concentrate.

As illustrated in the drawing, the manufactured product which is ready for concentration is passed to suitable storage facilities 11. The concentration is begun by passing the product from storage through conduit 12 into a first chiller 13. In chiller 13 water is frozen to form a crystal slurry which contains from about 20 to 50% and preferably about 25 to 40% solids. While it is desirable to concentrate as much as possible through the formation of crystal solids, if the solids content is too high the slurry becomes quite stiff and is to difficult to pass through the crystal purification column. In many cases the chiller and the purification column will be in one unit but for simplicity of illustration they have been shown as separate units in the drawing.

The crystal slurry from chiller 13 is passed through conduit 14 to crystal purification column 16. This crystal purification column can be a piston-type column substantially as described in the above cited patent of Schmidt or a pulse-type column as described in the patent to R. W. Thomas, 2,854,494. In either type of column the basic operation is the same in that a compacted mass of crystals is forced through the column and into a body of melt at the downstream end thereof. This body of melt is formed by melting the crystals through the introduction of heat through the heating means 17, such as heating coils or a steam line. The passage of the melt from the column is restricted so that the melt is displaced back into the crystal mass as the crystals are forced through the column into the body of melt. A filter section 18 is provided at an intermediate point in the column so that mother liquor can be withdrawn from the column and separated from the crystals.

As shown in the drawing, the operation is repeated by passing the mother liquor from column 16 through conduit 19 to chiller 20. The slurry from chiller 20 is passed through conduit 21 to purification column 22, which is equipped with a heating means 23 and a filter section 24 as described in connection with column 16. The mother liquor from column 22 is passed through conduit 26 to chiller 27 and the slurry from chiller 27 is passed through conduit 28 to purification column 29. In column 29 the crystal melt is formed by heating means 30 and the final concentrate is withdrawn from the column through filter section 31 by way of conduit 32. The concentration of the product as withdrawn from purification column 29 is such that when any added materials are incorporated therewith the ultimate concentration is as desired for the finished product. Water is withdrawn from purification column 16 through conduit 33 and combined with the water stream withdrawn from column 22 through conduit 34. A water stream is also withdrawn from column 29 through conduit 36 and all three water streams are combined in conduit 37. Instead of using 3 units connected in series as illustrated, an alternative scheme is to use the units in parallel relationship with a portion of the concentrate from each column recycled to the chiller feed of the same unit. This arrangement has the advantage of operating all units on rich feed. Of course any number of units can be used in series, parallel or series-parallel combinations.

The combined water streams contain about ½ to 3 wt. percent, preferably 1 to 2 wt. percent, of the mother liquor components and at least a portion of these components are recovered by distillation. Accordingly the streams are fed to fractionator 38 through conduits 39 or 40 depending upon the composition of the feed and the relative composition of the material in the fractionator. The fractionator illustrated in the drawing can be used to recover components obtained in the concentration of beer. The water stream removed from the purification columns in such case would contain both alcohol and sugar so that, if desired, both the alcohol and sugar products could be concentrated in overhead and kettle streams, respectively. In this case, water could be removed from the fractionator as a side draw through conduit 41. Alternatively, two separate columns can be used, with the second column fed by the overhead or the kettle product of the first. The overhead vapors are condensed in cooler 42 and the condensate is collected in accumulator 43. This condensate which contains alcohol is used in part to reflux the column, returning to fractionator 38 through conduit 44, and the remainder of the overhead condensate is passed through conduit 46 and valve 47 and added to the concentrated product in conduit 32. If the quantity of the overhead condensate in conduit 46 provides too much dilution for the concentrate in conduit 32, a portion or all of this overhead condensate can be passed through valve 48 and conduit 49 and returned to any one or all of chillers 13, 20, or 27, passing through valves 50, 51 or 52, respectively. It is thus shown that the recovered overhead condensate can be added back to the mother liquor by adding it directly to the concentrated product or by returning it to the crystal formation steps associated with any one or all of the purification columns. In certain instances it will be desirable to recycle some of this overhead product back to the chillers in order to lower the freezing point of the liquid being concentrated. This obtains a greater temperature differential in the columns and, hence, more efficient operation. In situations where the only recoverable mother liquor components are heavy materials, the overhead condensate is predominantly water and can be withdrawn from the system through valve 53.

The heavy materials which are present in the water streams from the crystal purification columns are recovered as a kettle product and circulated through conduits 54 and 56 and reboiler 57. If it is not desired to recover the heavy components or if the total recoverable material is more volatile than water so that the kettle product is essentially water, this kettle stream can be withdrawn from the system through valve 58. In many instances, however, the kettle product includes valuable sugars and oils which can be added to the concentrate in conduit 32 by way of valve 59 and conduit 60. If it is desired to salvage these heavy materials but the addition of this stream would dilute the concentrated product more than desired, this kettle product stream can be passed by way of valve 61 through conduit 62 and returned to product manufacture. For example, in the concentration of beer, the bottoms product could be recycled to the sparging step of the brewing process.

As a modification of our process a simple flash can be employed instead of fractionator 38 which in effect makes a single stage separation between the water and the mother liquor components. Any volatile oils or flavor components would be concentrated in the overhead from the flash step and could be added to the concentrated product. The bottoms from the flash could be recycled to product manufacture as illustrated. In still another modification of our invention as applied to the concentration of beer, part or all of the water stream in conduit 37 can be passed through valve 63 and conduit 64 into conduit 62 through which this material is returned to be used as makeup water in the brewing process. This method of operating would be of advantage, particularly in areas where the available water has a mineral content requiring pretreatment. The high quality water thus provided from the crystal purification columns would require no treatment prior to use and additionally would contain valuable alcohol, sugar and flavor components which would be recovered.

As stated above the process can be applied to a wide variety of products. In the concentration of beer the water streams from the purification columns contain both alcohol and sugar in significant amounts. In a preferred method of operation the alcohol is concentrated in the overhead condensate from the fractionator and returned to the chillers while the sugar is concentrated in the fractionator bottoms and added to the product concentrate. In concentrating citrus juices, most of the recoverable mother liquor components in the water stream are sugar and oils which are recovered as the kettle product in the fractionator and added to the product concentrate. In the concentration of milk, the mother liquor components in the water stream are predominantly sugars and fats which are separated from the water in the fractionator and accumulated in the kettle product. In the concentration of wine, the water stream contains alcohol and sugar. In this case, the alcohol is recovered in the overhead product and water and sugar are concentrated in the kettle product. Subsequent fractionations of the kettle product can be used to concentrate the sugar. In the concentration of coffee, oils and solids are accumulated from the water streams in the kettle product of the fractionator. In the concentration of vinegar, the overhead product is predominantly acetic acid and sugar is concentrated in the kettle product. It is apparent that the process can also be applied advantageously to concentrate many other types of beverages, food products, liquors, extracts, serums and the like.

To illustrate our invention further, the following example is presented in the concentration of beer. It should be understood that the conditions and materials employed are presented as typical only and should not be construed to limit our invention unduly.

EXAMPLE I

Beer direct from fermentation is concentrated to 25 percent of its original weight in a system using three chillers and concentration columns connected in series as shown in the drawing. Referring to the features as indicated in the drawing, the beer is cooled in chiller 13 to form a slurry containing 40 percent ice solids. The temperature of the slurry, which has the consistency of sherbet, is 26.1° F. Mother liquor is separated from the slurry in column 16 and this mother liquor is cooled to 22.2° F. in chiller 20 to form a second slurry containing 40 percent solids. This lurry is passed to column 22 and the mother liquor removed therefrom is cooled to 13.5° F. in chiller 27 to form a third slurry containing 40 percent ice solids. The mother liquor separated from this slurry in column 29 represents about 20 percent of the total feed and is a beer concentrate, containing 13.75 weight percent alcohol.

Columns 16, 22 and 29 are operated to produce water from the crystal melt at only 98 percent purity in order to obtain high throughput. The water streams from these columns are combined in line 37 and fed to fractionator 38. Fractionator 38 operates at 15 p.s.i.g., a top temperature of 200° F. and a kettle temperature of 250° F. The overhead product of water and alcohol is mixed with the mother liquor from column 29 to produce a final beer concentrate one-fourth of the original weight of the beer and four times the original alcohol content. The bottoms from fractionator 38 is predominantly water with about 1 percent sugar. This water is recycled to the brewing process to be used in sparging the mash. A material balance based on 100 pounds of beer from the fermenters is shown in Table I. The conduit numerals refer to the drawing.

*Table I*

STREAM FLOWS IN POUNDS BASED ON 100 POUNDS OF FEED

| Conduit | 12 | 19 | 33 | 26 | 34 | 32 | 36 | 37 | 46 | 62 | Product |
|---|---|---|---|---|---|---|---|---|---|---|---|
| Alcohol | 3.5 | 3.17 | 0.33 | 2.965 | 0.205 | 2.845 | 0.12 | 0.655 | 0.655 | | 3.5 |
| Extract | 5.0 | 4.53 | 0.47 | 4.235 | 0.295 | 4.055 | 0.18 | 0.945 | | 0.945 | 4.055 |
| Water | 91.5 | 51.50 | 40.00 | 27.800 | 23.700 | 13.800 | 14.00 | 77.7 | 3.645 | 74.055 | 17.445 |
| Total | 100.0 | 59.20 | 40.8 | 35.00 | 24.200 | 20.700 | 14.30 | 79.300 | 4.300 | 75.000 | 25.000 |
| Percent Alcohol | 3.5 | 5.35 | | 8.5 | | 13.75 | | 0.83 | 15.25 | | 14.00 |
| Percent Water | | | 98.0 | | 98.0 | | 98.0 | | | 98.8 | |

EXAMPLE II

Beer from fermentation as in Example I is concentrated to 25 percent of its original weight using a single chiller-concentration unit with recycle of mother liquor to chiller feed. Based on 100 pounds of fresh feed, 92.8 pounds of mother liquor containing 13.75 percent alcohol is recycled making the total feed to the chiller 192.8 pounds with an alcohol content of 8.45 percent. The feed is cooled to 13.5° F. to produce a slurry containing 40 percent solids. The crystal melt containing 99 percent water is withdrawn and fractionated as in Example I to produce an overhead stream and a kettle product. The overhead stream is added to the mother liquor product to form a final concentrate and the kettle product is recycled to the brewing process as make-up water. A material balance of the process is shown in Table II.

*Table II*

STREAM FLOWS IN POUNDS BASED ON 100 POUNDS OF FEED

| | Alcohol | Extract | Water | Total | Percent Alcohol |
|---|---|---|---|---|---|
| Fresh feed | 3.5 | 5.0 | 91.5 | 100.0 | 3.5 |
| Recycle | 12.740 | 18.188 | 61.872 | 92.8 | 13.75 |
| Total feed | 16.240 | 23.188 | 153.372 | 192.8 | 8.45 |
| Mother liquor | 15.925 | 22.735 | 77.340 | 116.0 | 13.75 |
| M. L. Product | 3.185 | 4.547 | 15.468 | 23.2 | 13.75 |
| Crystal melt | 0.315 | 0.453 | 76.032 | 76.8 | 0.41 |
| Overhead | 0.315 | | 1.485 | 1.8 | 17.5 |
| Bottoms | | 0.453 | 74.547 | 75.0 | |
| Total Concentrate | 3.5 | 4.547 | 16.953 | 25.0 | 14.00 |

EXAMPLE III

A solution of 11 weight percent methanol in water was cooled to 12° F. to form a slurry containing 30 weight percent ice solids. This slurry was passed through a piston-type crystal purification column from which an alcohol concentrate and a crystal melt stream were removed. When operating to produce a crystal melt stream of 99.8 percent water and 0.2 percent alcohol the rate of concentrate production was 23.5 gallons per hour per square foot of column cross section. By operating at a lower purity in the crystal melt, e.g. 99.5 weight percent water, the production rate was increased to 38.8 gal./hr./sq. ft. When the column was operated to produce a crystal melt stream of only 99 percent purity, the production rate increased to 67 gal./hr./sq. ft.

As will be apparent to those skilled in the art from the above description, various modifications can be made in our invention without departing from the spirit or scope thereof.

We claim:

1. A process for concentrating an aqueous food solution containing a component more volatile than water and a component less volatile than water which comprises cooling said solution until a slurry of at least 20 weight percent ice crystals in mother liquor is formed; passing said slurry into a confined elongated purification zone; moving said ice crystals in a compact mass through said zone into a body of crystal melt in a downstream portion of said zone; displacing melt into the advancing crystal mass; melting said ice crystals to form crystal melt at a rate such that said melt contains a substantial portion of said volatile component and a substantial portion of said less volatile component; separating mother liquor from said crystals by withdrawing mother liquor as a concentrated solution from a mid-portion of said confined zone; passing said melt to a fractional distillation zone; distilling said melt to form an overhead stream concentrated in said volatile component, an intermediate water reject stream, and a bottom stream concentrated in said component less volatile than water; and returning both of said overhead and bottom streams to solutions in the process.

2. The process of claim 1 wherein volatile components recovered by distillation are recycled to said cooling step.

3. The process of claim 1 wherein volatile components recovered by distillation are added directly to said concentrated solution.

4. A process for concentrating an aqueous food solution containing alcohol and sugar which comprises cooling said solution sufficiently to form a slurry containing about 20 to 50 weight percent ice crystals in mother liquor; passing said slurry into an elongated confined purification zone; moving said ice crystals in a compact mass through said zone into a body of crystal melt in a downstream portion of said zone; displacing melt into the advancing crystal mass; melting said ice crystals to form crystal melt at a rate such that said melt contains a substantial amount of alcohol; separating mother liquor from said ice crystals by withdrawing mother liquor as a concentrated solution from a mid-portion of said confined zone; passing said melt containing alcohol to a fractional distillation zone; distilling said melt to form an overhead stream concentrated in alcohol, an intermediate water reject stream, and a bottom stream concentrated in sugar; and returning both of said overhead and bottom streams to solutions in the process.

5. A process for making beer concentrate which comprises cooling a beer solution to form a slurry of about 20 to 50 weight percent ice crystals in mother liquor, passing said slurry into an elongated, confined purification zone, moving said ice crystals in a compact mass through said zone into a body of crystal melt in a downstream portion of said zone; displacing melt into the advancing crystal mass; melting said ice crystals at a rate such that said melt contains sugar and at least ½ weight percent alcohol; separating mother liquor from said ice crystals by withdrawing mother liquor as a concentrated beer solution from a mid-portion of said confined zone; passing said melt containing sugar and alcohol to a fractional distillation zone; distilling said melt to form an overhead stream concentrated in alcohol, an intermediate water reject stream, and a bottom stream concentrated in sugar; and returning both of said overhead and bottom streams to solutions in the process.

6. The process of claim 5 wherein beer concentrate is formed in a series of cooling and purification stages as defined with the melt from each stage being combined and distilled to recover the alcohol therein.

7. The process of claim 5 wherein a portion of the concentrated mother liquor is recycled to said cooling step.

8. A process for making beer concentrate which comprises cooling a beer solution to form a slurry of about 20 to 50 weight percent ice crystals in mother liquor, passing said slurry into an elongated, confined purification zone, moving said ice crystals in a compact mass through said zone into a body of crystal melt in a downstream portion of said zone; displacing melt into the advancing crystal mass; melting said ice crystals at a rate such that said melt contains about 97 to 99.5 weight percent water and about ½ to 3 weight percent beer components predominantly alcohol and sugar; separating mother liquor from said ice crystals by withdrawing mother liquor as a concentrated beer solution from a mid-portion of said confined zone; passing said melt containing alcohol and sugar to a distillation zone; distilling said melt to form an overhead stream concentrated in alcohol, an intermediate water reject stream, and a bottom stream concentrated in sugar; and returning both of said overhead and bottom streams to solutions in the process.

References Cited by the Examiner
UNITED STATES PATENTS

| Re. 23,810 | 3/54 | Schmidt | 99—205 |
|---|---|---|---|
| 1,738,275 | 12/29 | Baker | 99—200 |
| 2,588,337 | 3/52 | Sperti | 99—205 |
| 2,625,505 | 1/53 | Cross | 99—205 |
| 2,815,288 | 12/57 | McKay | 99—205 |
| 2,851,368 | 9/58 | Findlay | 99—205 |
| 2,895,835 | 7/59 | Findlay | 99—199 |
| 2,977,234 | 3/61 | Wenzelberger | 99—205 |

A. LOUIS MONACELL, *Primary Examiner.*

ABRAHAM H. WINKELSTEIN, *Examiner.*